US006658436B2

United States Patent
Oshinsky et al.

(10) Patent No.: US 6,658,436 B2
(45) Date of Patent: Dec. 2, 2003

(54) LOGICAL VIEW AND ACCESS TO DATA MANAGED BY A MODULAR DATA AND STORAGE MANAGEMENT SYSTEM

(75) Inventors: David Alan Oshinsky, East Brunswick, NJ (US); Paul Ignatius, Jackson, NJ (US); Anand Prahlad, East Brunswick, NJ (US); Andreas May, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 217 days.

(21) Appl. No.: 09/774,301

(22) Filed: Jan. 30, 2001

(65) Prior Publication Data
US 2001/0047368 A1 Nov. 29, 2001

Related U.S. Application Data
(60) Provisional application No. 60/179,345, filed on Jan. 31, 2000.

(51) Int. Cl.[7] .............................................. G06F 17/30
(52) U.S. Cl. .................... 707/204; 707/10; 707/103 R; 707/205
(58) Field of Search .................... 707/10, 100, 102, 707/104.1, 202, 203, 204, 103 R, 205, 206; 705/2, 3, 42; 717/100; 711/113, 117; 709/203; 714/1, 4, 20

(56) References Cited

U.S. PATENT DOCUMENTS

| 5,005,122 A | 4/1991 | Griffin et al. ............... 709/203 |
|---|---|---|
| 5,212,772 A | 5/1993 | Masters ........................ 714/20 |
| 5,321,816 A | 6/1994 | Rogan et al. ................ 395/200 |
| 5,448,724 A | 9/1995 | Hayashi .......................... 714/4 |
| 5,491,810 A | 2/1996 | Allen ........................... 395/444 |
| 5,495,607 A * | 2/1996 | Pisello et al. .................. 707/10 |
| 5,649,185 A * | 7/1997 | Antognini et al. ............. 707/9 |
| 5,673,381 A | 9/1997 | Huai et al. ...................... 714/1 |
| 5,812,398 A * | 9/1998 | Nielsen ........................ 713/200 |
| 5,813,009 A | 9/1998 | Johnson et al. ............. 717/100 |
| 5,950,205 A | 9/1999 | Aviani, Jr. ............... 707/103 R |
| 6,021,415 A | 2/2000 | Cannon et al. ............. 707/206 |
| 6,131,095 A | 10/2000 | Low et al. ..................... 707/10 |
| 6,161,111 A | 12/2000 | Mutalik et al. ............. 707/205 |
| 6,292,783 B1 | 9/2001 | Rohler et al. .................. 705/2 |
| 6,466,592 B1 * | 10/2002 | Chapman ..................... 370/537 |
| 6,473,794 B1 * | 10/2002 | Guheen et al. ............. 709/223 |

FOREIGN PATENT DOCUMENTS

| EP | 0259 912 A | 3/1988 |
|---|---|---|
| EP | 0 467 546 A | 1/1992 |
| EP | 0 774 715 A | 5/1997 |
| EP | 0 809 184 A | 11/1997 |
| EP | 0 899 662 A | 3/1999 |
| WO | WO 95 13580 A | 5/1995 |

OTHER PUBLICATIONS

PCT International Preliminary Examination Report dated Nov. 5, 2001.

(List continued on next page.)

*Primary Examiner*—Shahio Al Alam
(74) *Attorney, Agent, or Firm*—Brown Raysman Millstein Felder & Steiner LLP

(57) ABSTRACT

A data retrieval system that includes a computer system having a processor that supports operation of at least one software application that is used for retrieving data in the computer system. A plurality of storage media are communicatively coupled to the processor with the plurality of storage media having data stored in at least one of the plurality of storage media. The software application has a retrieval module for retrieving data from the plurality of storage media, and a storage and backup map is included that indicates to the retrieval module a particular location of the data that is to be retrieved by the retrieval module.

10 Claims, 11 Drawing Sheets

OTHER PUBLICATIONS

PCT International Written Opinion dated Oct. 24, 2001.

Luis–Felipe Cabrera, et al: "ADSM: A Multi–Platform, Scalable, Backup and Archive Mass Storage System", Digest of Papers of the Computer Society Computer Conference (Spring) Compcon, US, Los Alamitos, IEEE Comp. Soc. Press, Vol. Conf. (Mar. 5, 1995), pp. 420–427.

Jander, M.: "Launching Storage–Area Net", Data Communications, US, McGraw Hill, NY, vol. 27, No. 4 (Mar. 21, 1988), pp. 64–72.

* cited by examiner

US 6,658,436 B2

LOGICAL VIEW AND ACCESS TO DATA MANAGED BY A MODULAR DATA AND STORAGE MANAGEMENT SYSTEM

CROSS-REFERENCE TO RELATED APPLICATION

The present application is based on and claims the benefit of U.S. Provisional Application Ser. No. 60/179,345, filed Jan. 31, 2000, pending, which is hereby incorporated by reference herein in its entirety.

BACKGROUND

1. Field of the Invention

The present invention generally relates to data retrieval and more particularly to the logical view and access to data managed by a modular data and storage management system.

2. Description of the Related Art

Conventional methods require a user to know ahead of time where exactly data is stored in order to retrieve it. The user needs to be aware of the operating system and server platform type from which the data was originated. In addition, the user needs to know the media type (magnetic disk, optical, tape, or other media) the data is stored on. Moreover, the user needs to know of the exact media on which the data is stored in addition to when and where it was stored.

Many other problems and disadvantages of the prior art will become apparent to one skilled in the art after comparing such prior art with the present invention as described herein.

SUMMARY

Various aspects of the present invention are realized through a data retrieval system that includes a computer system having a processor that supports operation of at least one software application that is used for retrieving data in the computer system. A plurality of storage media are communicatively coupled to the processor with the plurality of storage media having data stored in at least one of the plurality of storage media. The software application has a retrieval module for retrieving data from the plurality of storage media, and a storage and backup map is included that indicates to the retrieval module a particular location of the data that is to be retrieved by the retrieval module.

In certain embodiments, the software application of the data retrieval system includes a tool bar that allows access to particular characteristics of a file that has been stored in at least one of the plurality of storage media. The particular characteristics may include file creation date, file backup dates, and file access dates. The software application could also include a view menu that offers a user an option to select a date in which to begin displaying a history of a selected file(s).

Various aspects of the present invention may also be realized through a method for retrieving data in a computer system. The computer system has a plurality of storage media where the data is stored, and the method involves, not necessarily in this order, requesting access to selected data of the computer system; activating a retrieval control to find a particular location of the selected data that has been requested; searching, with the retrieval control, the plurality of storage media for the selected data based upon instructions contained in a storage map; retrieving an indication of the selected data from the particular location in the plurality of storage media; and displaying the indication such that a user has an option of gaining additional information regarding the selected data.

The method may also include selecting the indication to display a backup history of a portion of the selected data, to display a history of access times for a portion of the selected data, or to display an origination date of a portion of the selected data.

Other aspects of the present invention will become apparent with further reference to the drawings and specification which follow.

DETAILED DESCRIPTION OF THE DRAWINGS

An exemplary description of the present invention is a retrieval system that allows end users to view and access in the logical format that they are used to with their applications or systems. The users just have to define the general outline (such as part of the file name or file path or approximately when the data may have existed or the desired point-in-time view of the data) of the data that they are looking for. The data will then be retrieved and presented to the user regardless of the media type that it was stored on or platform type on which it was controlled. The user can then select the exact version of the data desired.

Figure 1:
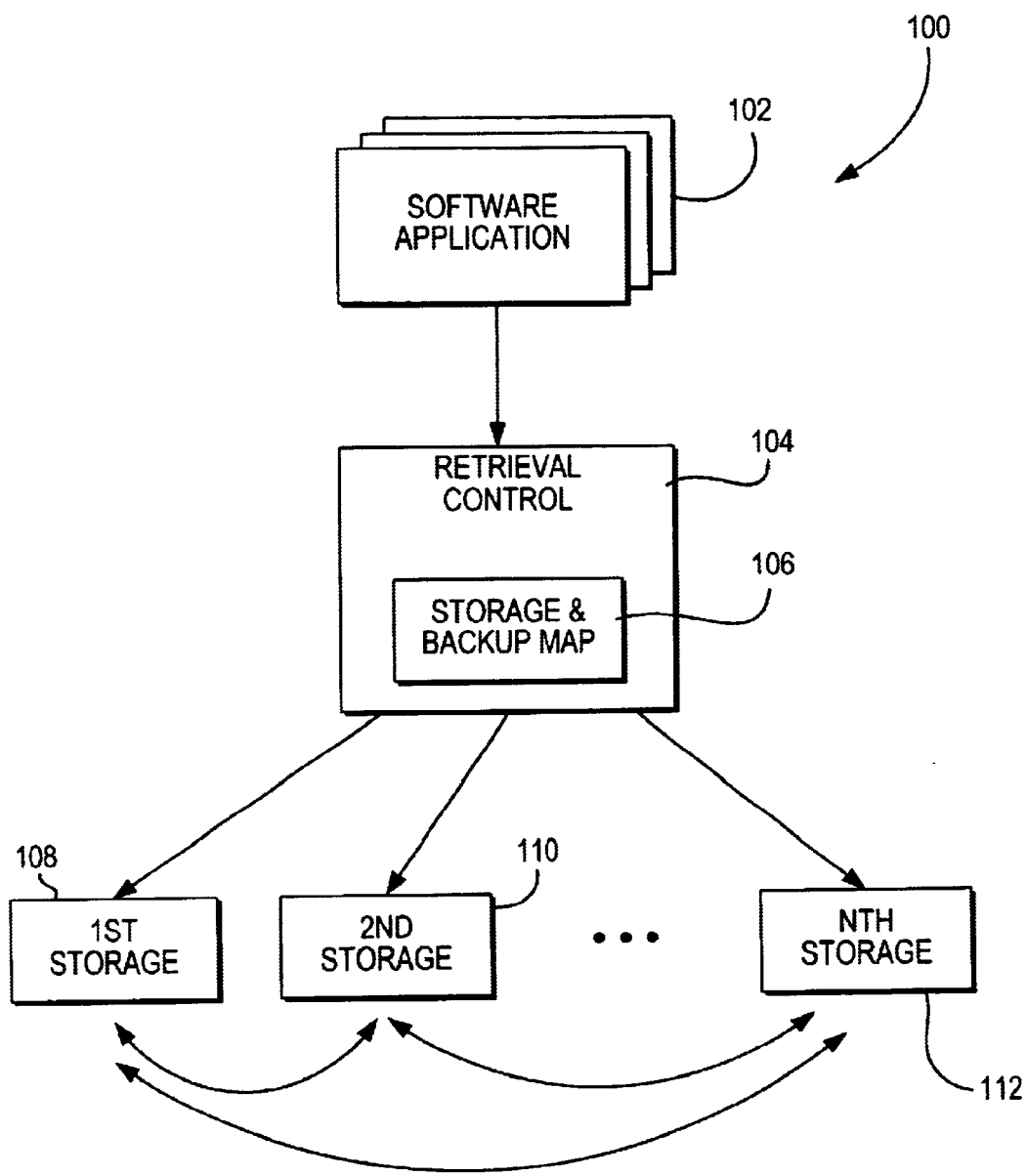
FIG. 1 is a block diagram of an exemplary embodiment of a retrieval system that operates according to principles of the present invention.

FIG. 1 is a block diagram of an exemplary embodiment of a retrieval system 100 that operates according to principles of the present invention. The retrieval system 100 includes software applications 102 that a user interacts with to retrieve data from various storage media. The software applications 102 communicate with a retrieval control 104 that determines where to retrieve data from the storage media based on instructions and information available in a storage and backup map 106. The retrieval control 104 typically receives data from the storage media that the software applications 102 have requested. When the software applications 102 request data, the retrieval control 104 determines whether to retrieve the data from a first storage media 108, a second storage media 110, or any number of other storage media down to an nth storage media 112. The retrieval control 104 locates the data to be retrieved according to storage information available in the storage and backup map 106 and the retrieval control 104 is then able to determine which storage media the data will be retrieved from regardless of migration of the data after initial storage in the storage media.

For example, the retrieval control 104 may retrieve data from the second storage media 110 that was initially stored in the first storage media 108 and, unbeknownst to the software applications 102 had since migrated to the second storage media 110. In addition, the retrieval control 104 could retrieve data from any other of the storage media which are illustrated. The storage and backup map 106 is continually updated when data is moved between storage media, e.g., from the first storage media 108 into the nth storage media 112. Of course, the data could be moved in either direction and between any of the storage media while the storage and backup map 106 is updated with the changes. In this manner, the software application 106 is enabled to request and retrieve data from the storage media by means of a simple request for the data. Advantageously, the user is not required to know the latest location of the data in the storage media to request the data. Thus, retrieval of data from many types of storage media is available without assistance beyond the retrieval system 100 itself.

Figure 2:
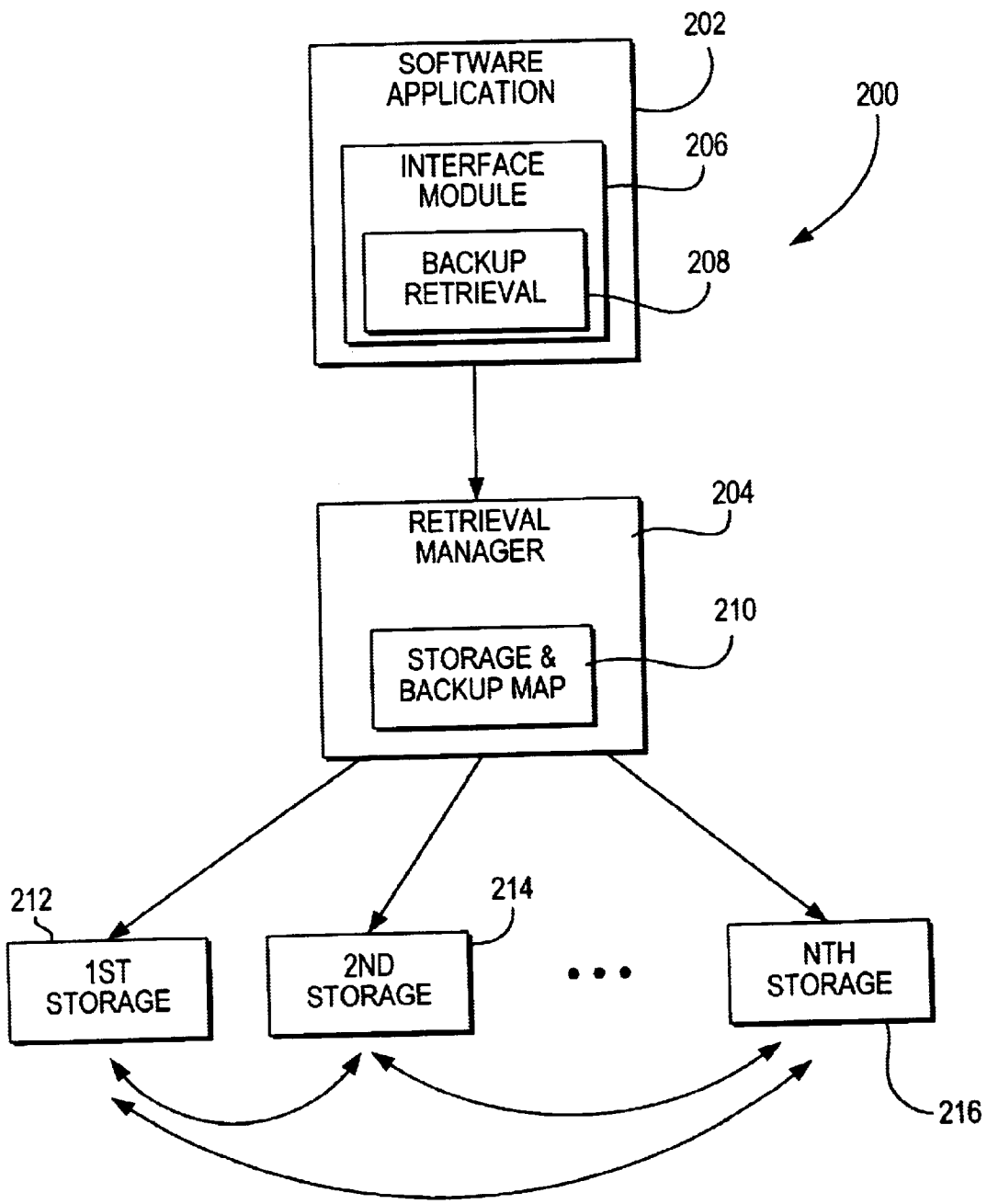
FIG. 2 is a block diagram of another exemplary retrieval system that operates in accordance with the principals of the present invention.

FIG. 2 is a block diagram of an exemplary retrieval system 200 that operates in accordance with the principals of the present invention. The retrieval system 200 includes a software application 202 and a retrieval manager 204 that interoperate to retrieve data from different storage media in the retrieval system 200. The software application 202 includes an interface module 206 and a backup retrieval 208. Thus, when the software application 202 desires to retrieve data, it begins by sending a request through the interface module 206 where the retrieval manager 204 then accesses a storage and backup map 210 to find the exact location of the data that is to be retrieved. The data may be located in a first storage media 212, a second storage media 214, or any number of storage media down to an nth storage media 216. The data that is to be retrieved may be stored on any of the storage media, and over time, may migrate from one storage media to the other. The storage and backup map 210 tracks the migration of the data so that the current location of the data is always available for access by the software application 202.

Figure 3:
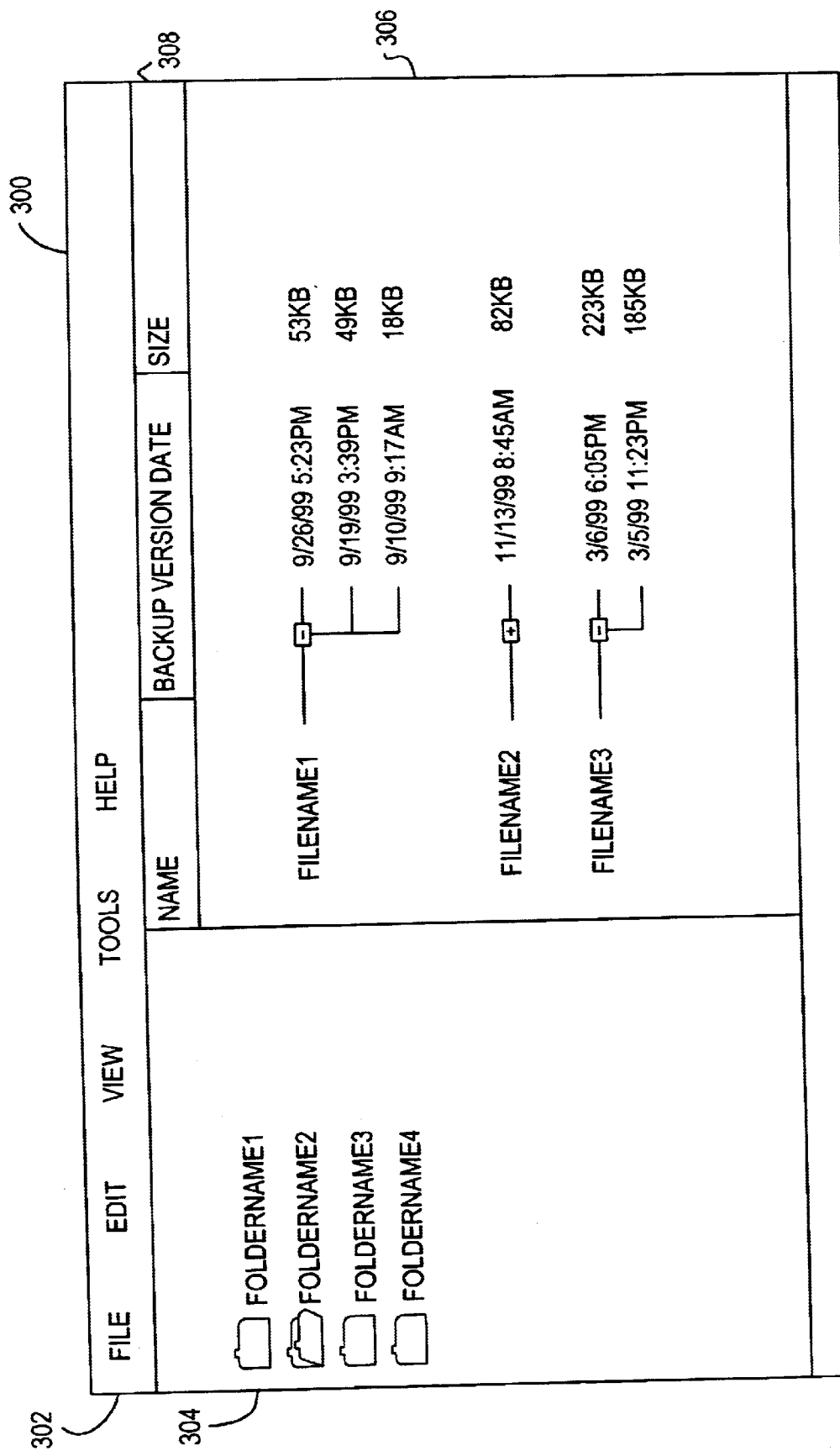
FIG. 3 is an illustration of an exemplary file browser that can be used for viewing data prior to retrieval of the data from the retrieval systems of FIGS. 1 and 2.

FIG. 3 is an illustration of an exemplary file browser 300 that can be used for viewing data prior to retrieval of the data from the retrieval systems 100 or 200. The file browser 300 includes a tool bar 302 that enables a user to access the data in various manners. Although the file browser 300 can be implemented in various manners, the file browser 300 is generally divided into a folder hierarchy 304 where folder names can be viewed and a file list 306 where particular files of the selected folder are displayed. The file list 306 includes a file information bar 308 that can be dynamically modified for viewing different information concerning the files of the file list. Corresponding to the items selected for viewing in the file information bar 308 are, first, a column reflecting the name of the files that exist in the particular folder that has been selected. In the embodiment of FIG. 3, foldername2 has been selected in the folder hierarchy 304 and filename1, filename2, and filename3 appear as the files in the foldername2. Each of the files in the file list 306 includes backup information which includes the backup date and time of the filename. This information is listed in a second column of the file list 306 under the title "backup version date" from the file information bar 308. Filename1 shows three different backup dates and times. This is because a user has opened the versions of the file name other than the latest version that has been most recently saved. For example, filename2 shows the default display under the backup version portion of the file information bar 308. This is the default because a plus sign is shown and other backups that have been completed are not shown with regard to filename2. Although only 3 backups are indicated for filename1, other files that are displayed in the file list 306 may contain many more backups based on the history of the file. The third column indicates the size of the files at the time they were backed up.

Figure 4:
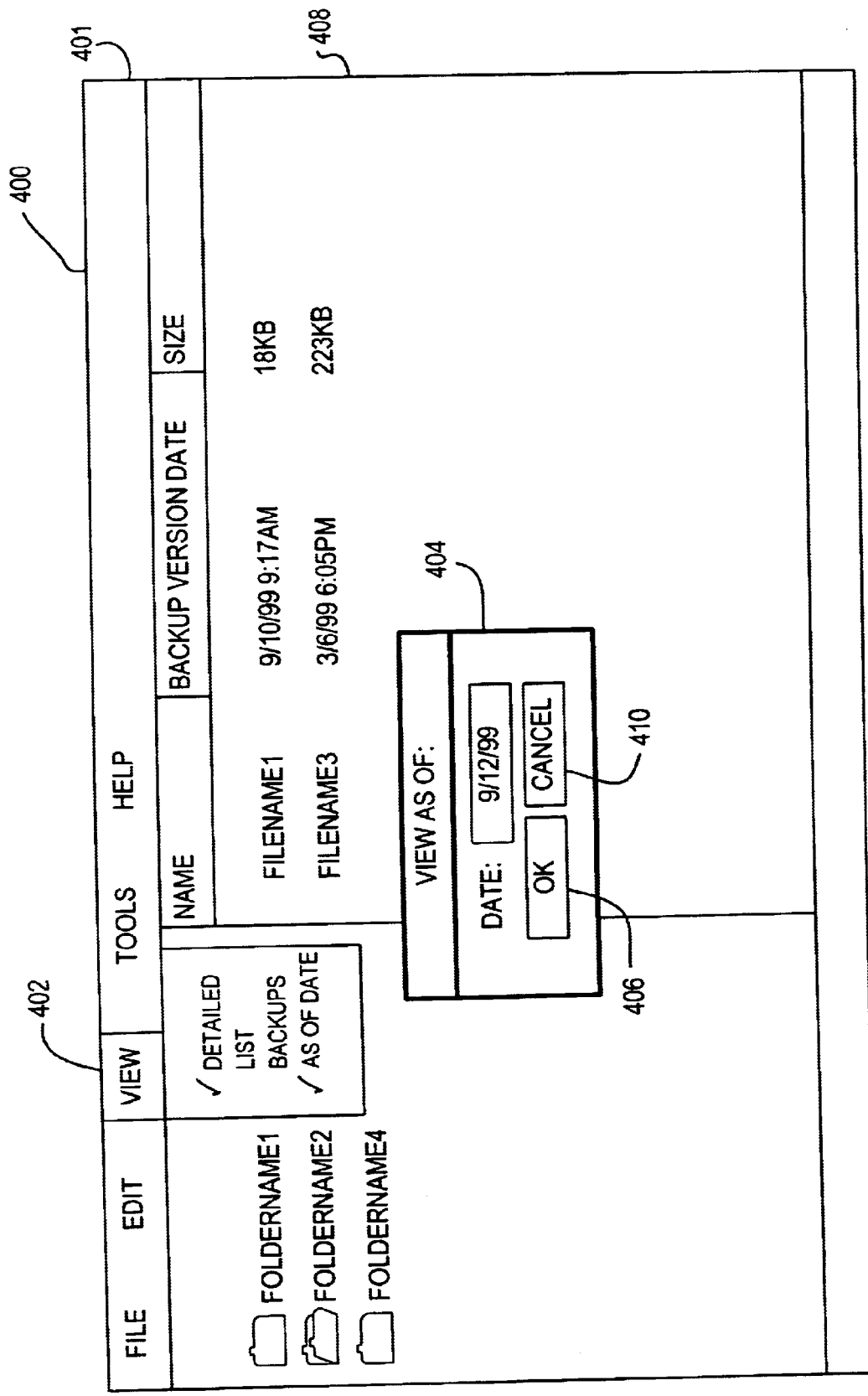
FIG. 4 is an exemplary file browser illustrated in accordance with principals of the present invention.

FIG. 4 is an exemplary file browser 400 illustrated in accordance with principals of the present invention. The file browser 400 includes a toolbar 401 similar to the file browser 300 and specifically, the view menu 402 of the tool bar is illustrated to indicate that a user may select what portions of a file to view. As illustrated, a user may select a detailed display of a file and a date for which the user desires to view the history of the file. For example, if the user selects "as of date" as illustrated, a view "as of date" box 404 appears on the file browser 400. The user may select the date of interest for file viewing. For example, the user may desire to see all backups that have been made of files that are in foldername2 as of Sep. 12, 1999. When the user makes the selection, the user will press an okay button 406 and the files that are displayed in file list 408 will only include those file which existed prior to Sep. 12, 1999. Thus, a quick comparison of the files shown in the file list 408 to those files shown in the file list 306, show dates earlier than Sep. 12, 1999. Of course, the view "as of date" box 404 could be modified to include a time selection as well as a day selection, but for ease of understanding only a day box is illustrated. If the user has selected the view "as of date" box 404 but decides not to view a particular date, the user may press a cancel button 410 to return to the regular features of the file browser 400.

Figure 5:
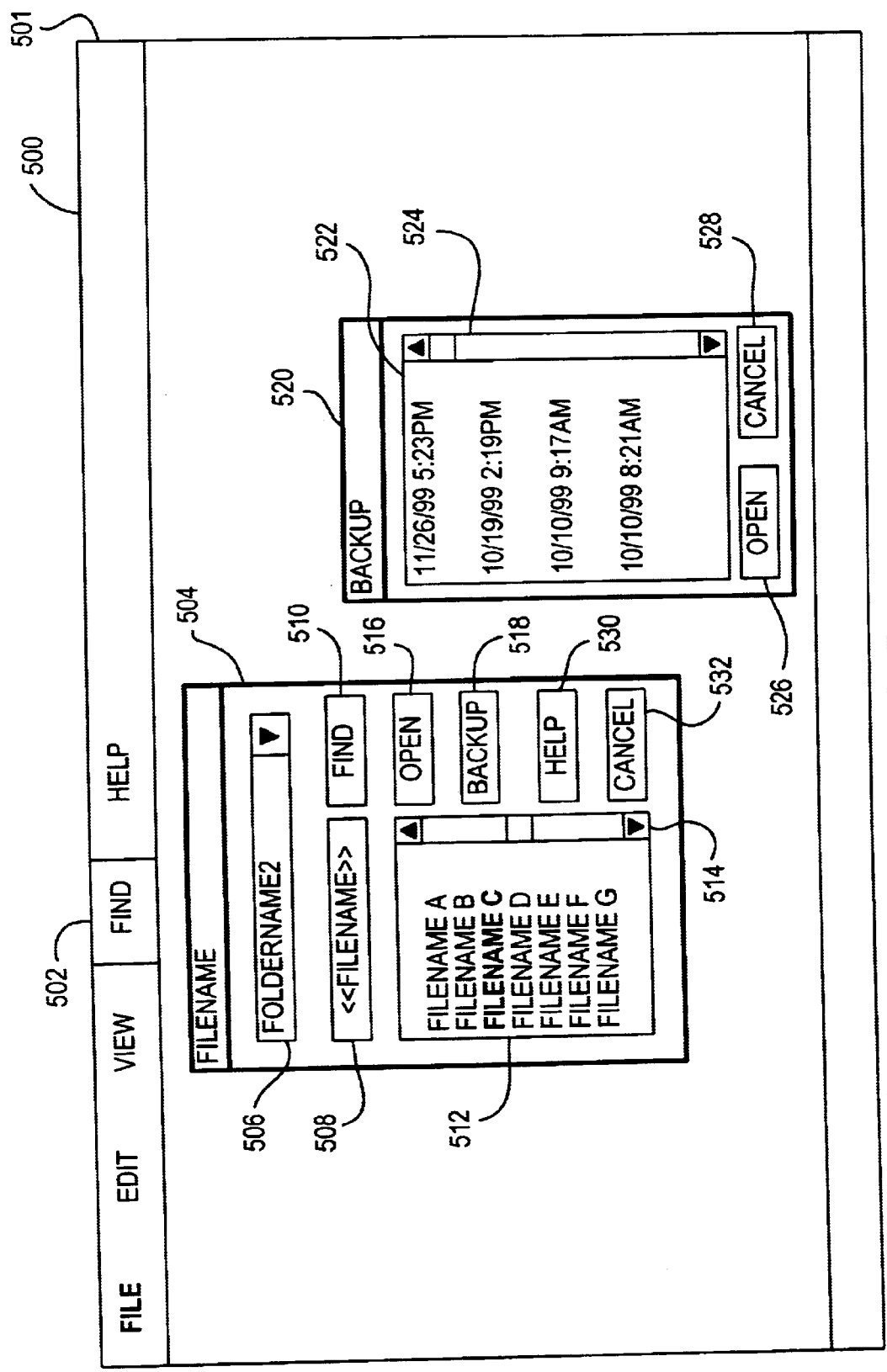
FIG. 5 is an exemplary file browser where an exemplary find mechanism is illustrated.

FIG. 5 is an exemplary file browser 500 where an exemplary find mechanism is illustrated. The file browser 500 has a tool bar 501 that includes a find menu 502. A user may select the find menu 502 to produce a find dialog box 504. The find dialog box 504 includes a folder selector box 506 where the user may select a particular folder in which to search for a particular file. After selection of the particular folder to search, the user may enter a file name for which to search. This file name would be entered in a file name search box 508. Of course, the file name may be entered with wild cards or other search techniques which are commonly available in most operating systems. After a file is entered into the file name search box 508, the user may press a find button 510 and the search results are displayed in a found file box 512. The user may use a scroll bar 514 for scrolling up and down the file list that is displayed in the found file box 512.

When a user finds the file which they were searching for, the user may press the open button 516 to view the file. A backup button 518 is also available for a user to list the backup information for the particular file which they are searching. When the backup button 518 is pressed, a backup window 520 appears on the file browser 500 and a list of backup dates 522 is shown for the user to view. The user may scroll through the list of backup dates using scroll bar 524, but other techniques may be available for searching the list of files that show up in the backup box 520. When the user finds a particular backup date of interest, the user may open that file using an open button 526. When the user has completed viewing the files in the backup box 520, the user may cancel viewing the backup box 520 by pressing a cancel button 528. A cancel button 532 is also available to cancel out of the find dialog box 504 completely. If the user is in need of further assistance the user may also press a help button 530. Upon pressing the help button 530, the user is given help in formats similar to a typical operating system help function.

Figure 6:
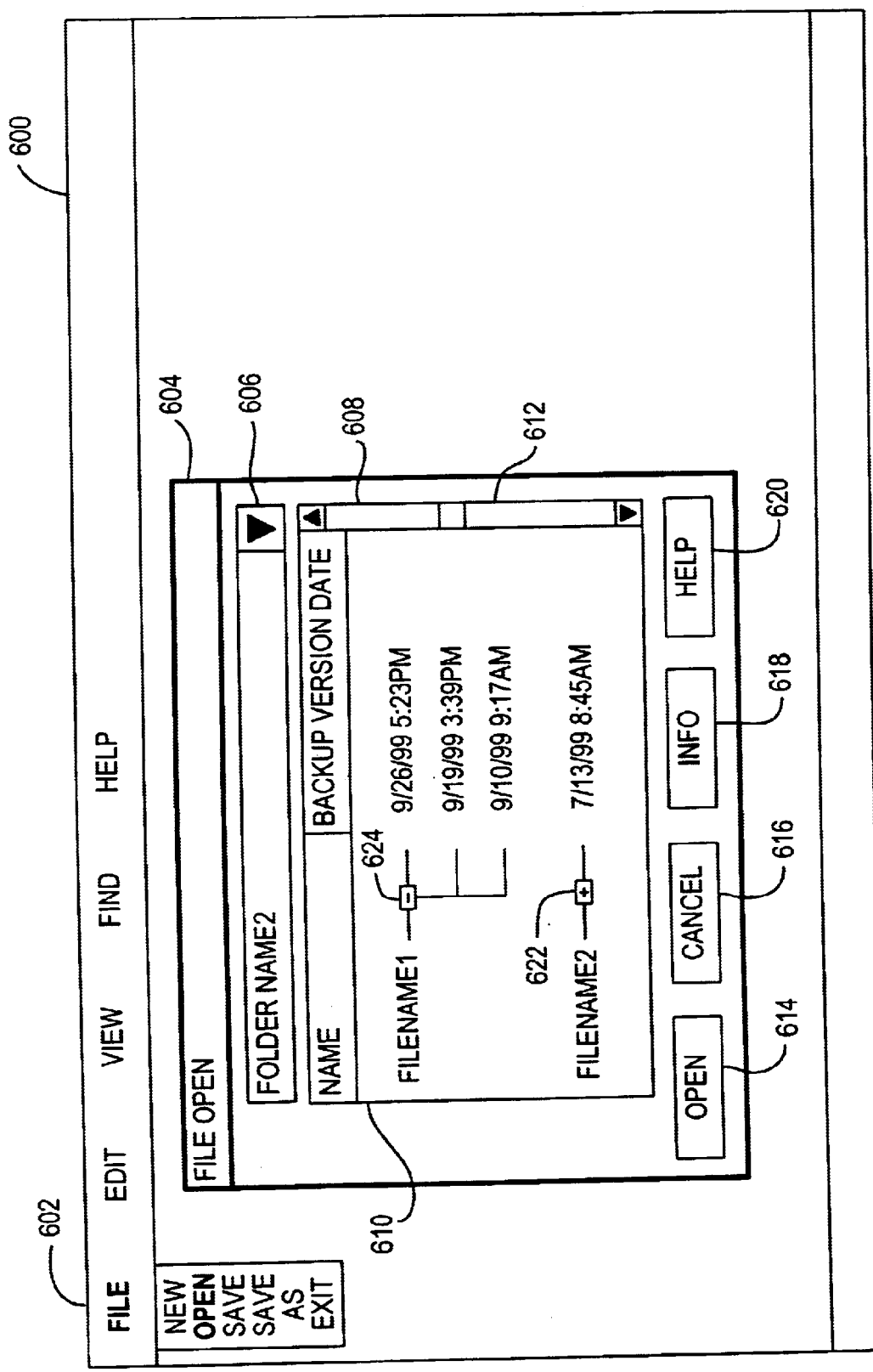
FIG. 6 illustrates an exemplary standard Windows application and how the retrieval system of the present invention may interact therewith.

FIG. 6 illustrates an exemplary standard Windows application 600 and how the retrieval system of the present invention may interact therewith. The standard Windows application 600 may be an application such as a word processing application and a file menu 602 may be entered when a user desires to open a file. The user will select the open option of the file menu 602 and a file open application will intercept the request to the operating system to open a file open dialog box 604.

The file open box 604 includes a folder selector box 606 where a user may enter the name of the desired folder to enter. Upon determining a folder name, e.g., foldername2, a file list 608 is displayed. The file list 608 includes a file information bar 610 that is modifiable but is shown including a name column and a backup version date column. As with other embodiments, the file names may be listed in the file list 608 with a default backup version date of the last backup that was completed for each file or the last save that was performed on each file. If a user desires to see a detailed history of backup dates, the user may press a plus button 622 which will then change to a minus button 624 as illustrated in the file list 608. A scroll bar 612 is illustrated as a tool for a user to scroll through different file names to find the file which the user may desire to retrieve.

When a user has found the file of interest, the user may press an open button 614 to open the particular file. If a user is unable to find the desired file or desires to exit the file open dialog box 604, the user may press a cancel button 616 to exit the file open dialog box 604. The user is also able to press an information button 618 to get further information concerning each of the files. The information button 618 may allow the user to select particular options such as an "as of date", a specific date, or even a range of dates. The file open dialog box 604 is illustrated with a help button 620 that can also operate similar to common operating system help buttons.

Figure 7:
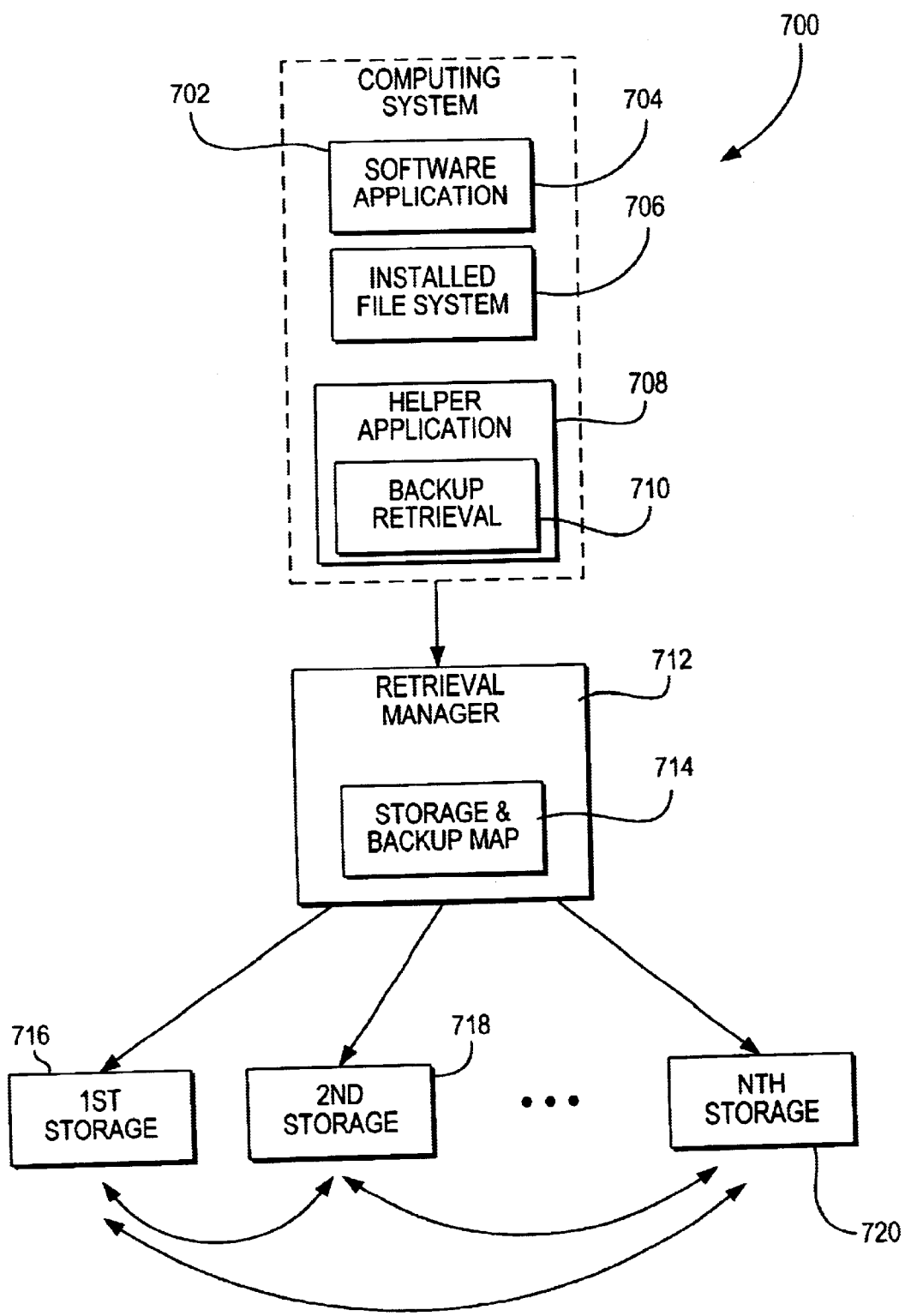
FIG. 7 is an exemplary retrieval system wherein a computing system is illustrated and is similar to the software application of FIG. 2.

FIG. 7 is an exemplary retrieval system 700 wherein a computing system 702 is illustrated and is similar to the software application 202. The computing system 702 includes a software application 704 that interacts with an installed file system 706 and a helper application 708. The helper application 708 includes a backup retrieval module 710 for interacting with a retrieval manager 712. The retrieval manager 712 interacts with storage media by obtaining information from a storage and backup map 714. In this manner, the computing system 702 can retrieve data from any one of a first storage media 716, a second storage media 718, . . . and nth storage media 720. As previously explained, data on the storage media may migrate from one storage media to another depending on various storage policies.

Figure 8:
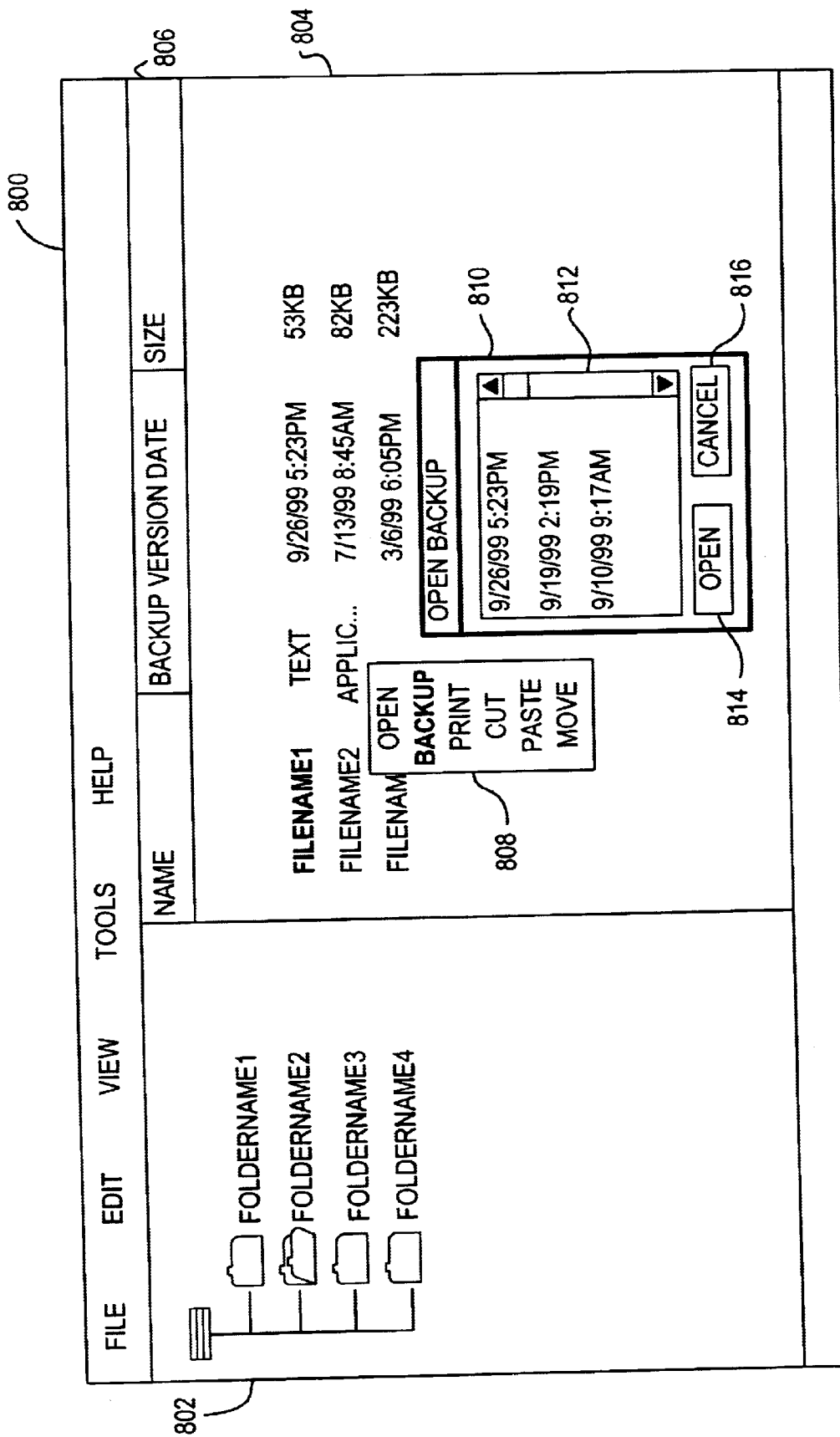
FIG. 8 illustrates an exemplary Windows application such as Windows Explorer as it operates under principles according to the present invention.

FIG. 8 illustrates an exemplary Windows application 800 such as Windows Explorer. The Windows application 800 includes many of the same features as are commonly available on most Windows application. However, if the Windows application 800 is Windows Explorer, only a single parent directory rather than numerous drives are illustrated in a folder hierarchy 802 on the left half of the windows application 800. On the right half of the Windows application 800 is illustrated a file list 804. The file list 804 includes a file information bar 806 that is dynamic and may be changed to reflect various pieces of information regarding the files in the file list 804.

When a user views a file of interest from the file list 804, the user may access an operations menu 808 that is available by right clicking on the file of interest or through other standard Windows operations. The options menu 808 is a standard Windows option menu but includes additional features such as a "backup" selection. If the user selects the backup option from the options menu 808, a backup dialog box 810 opens. The backup dialog box 810 includes a list of dates for which the particular file was backed up over time. The different dates may be viewed through movement of a scroll bar 812 by the user. If the user finds a file of interest in the backup dialog box 810, the user may open the particular file by clicking on the file and then clicking on an open button 814 to open the file. To open the file, the user may also double click on the file of interest as is commonly done in standard operating systems. Those skilled in the art and viewing this disclosure will understand that various other options may be available for selecting a particular file to view. When the user is complete with the backup dialog box 810, the user may press a cancel button 816 to exit the backup dialog box 810.

Figure 9:
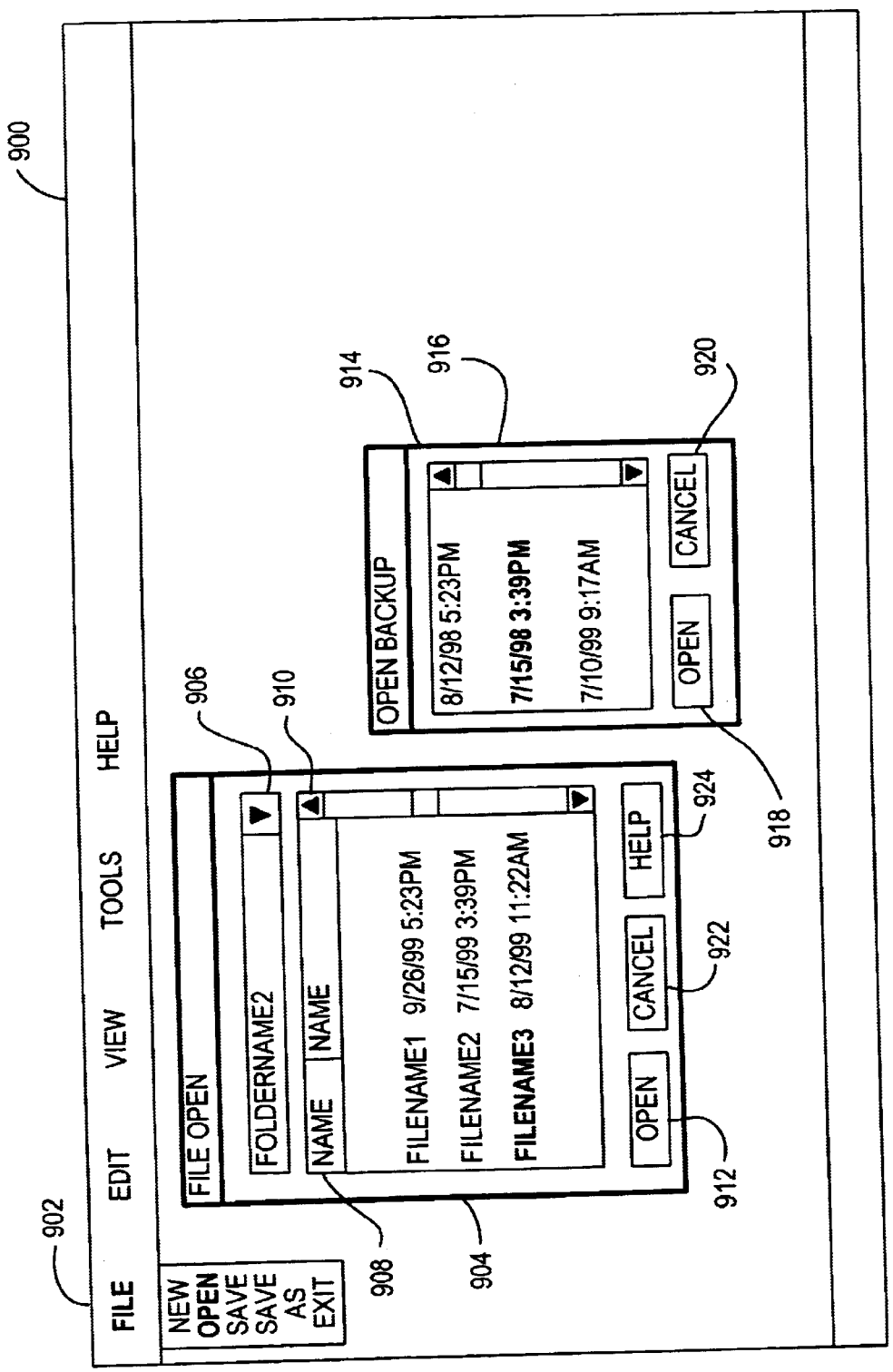
FIG. 9 illustrates another exemplary standard Windows application as it may interact with the retrieval system of the present invention.

FIG. 9 illustrates another exemplary standard Windows application 900 as it may interact with the retrieval system of the present invention. In the Windows application 900, a file menu 902 is used to open a file. When a user selects the open option of the file menu, a file open dialog box 904 appears on the Windows application 900. This file open dialog box 904 is not the standard Windows operating system dialog box but is produced by an application that intercepted the command from the open menu 902 when the user selected it, thereby allowing the file open dialog box 904 to be activated rather than the standard Windows open dialog box. The file open dialog box 904 includes a folder selector box 906 where the user may select a particular folder to find the file of interest to open. Upon selection of the appropriate folder in the folder selector box 906, a list of available files is shown in the file open dialog box 904.

The file open dialog box 904 includes a file information bar 908 that is adjustable to reflect the information that the user desires to view in the file list. In the file information bar 908 illustrated in FIG. 9, only a name column and a date column are illustrated, but the options could be modified according to a user's needs. The files listed in the file open dialog box 904 can be viewed through use of a scroll bar 910. When the appropriate file is found, the user may select the file, in this example filename3, and open the file immediately with an open button 912. However, the user may desire to view backup copies of filename3 and therefore right click on filename3 to select an open backup dialog box 914.

The open backup dialog box 914 lists the backups that have been performed for the filename3, and the user is able to scroll through these backups to find the appropriate backup date by using a scroll bar 916. Of course, other options for finding the appropriate backup file are available and this illustration is exemplary only. When the appropriate backup date is found, the user may press an open button 918 to open the version of the file that has been selected. When the user has completed using the open backup dialog box 914, the user may press a cancel button 920 to exit the window and return to the file open dialog box 904. At this point, the user may press a cancel button 922 to exit the file open dialog box 904. A help button 924 is available as in a manner that is similar to standard operating system help buttons.

Figure 10:
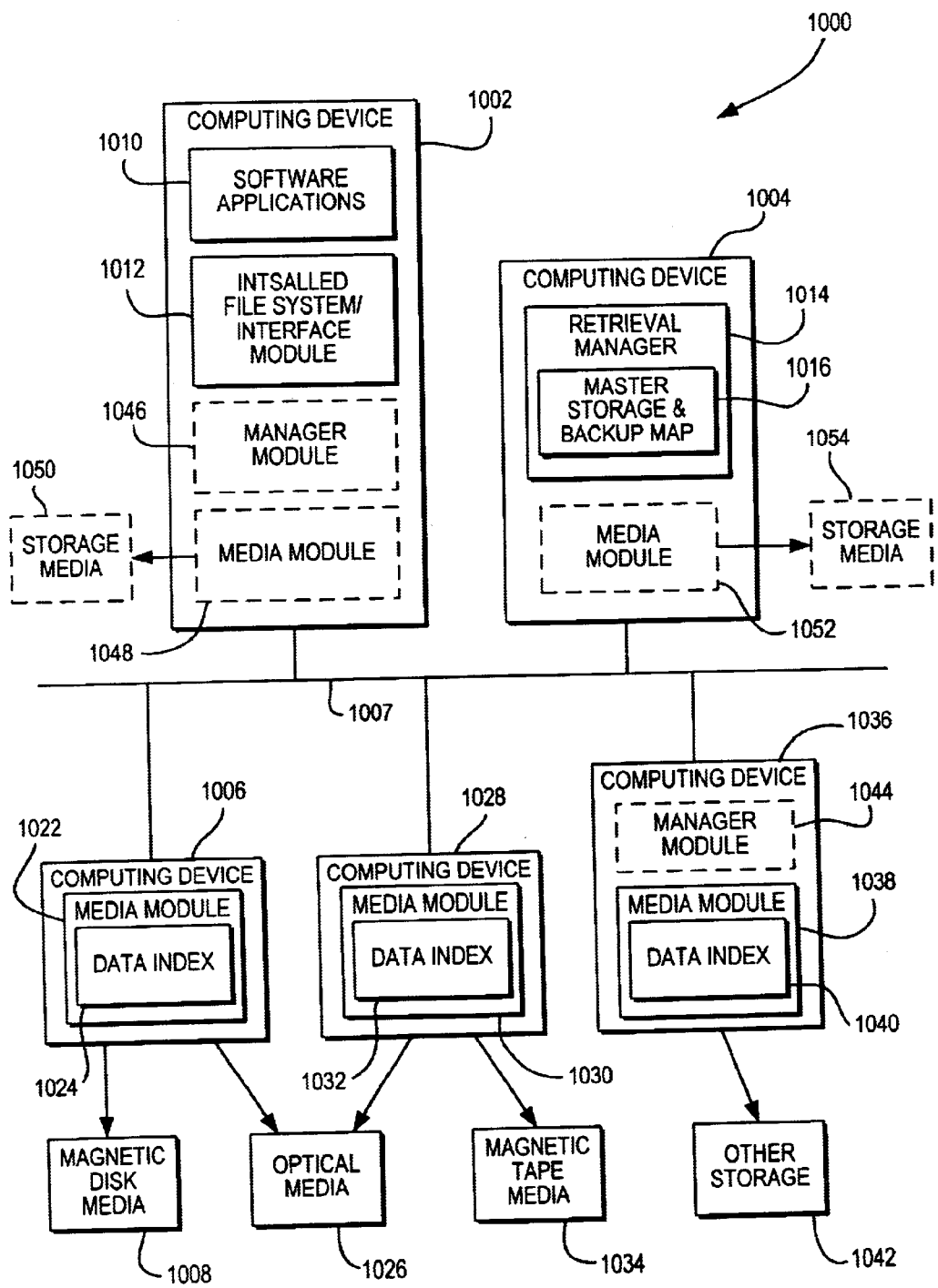
FIG. 10 is a block diagram of an exemplary retrieval system that is illustrated in greater detail than the retrieval systems of previous figures of the present disclosure.

FIG. 10 is a block diagram of an exemplary retrieval system 1000 that is illustrated in greater detail than earlier retrieval systems of the present disclosure. The retrieval system 1000 includes a computing device 1002, a computing device 1004, and a computing device 1006 that are interconnected and communicate with one another wia a network 1007. The computing device 1006 includes a magnetic disk media 1008 for storage of data that the computing device 1006 receives from the computing device 1002.

The computing device 1002 includes software applications 1010 and installed file system 1012. The installed file system 1012 works with an interface module to retrieve data in the retrieval system 1000. When data is to be retrieved for the software application 1010, the installed file system/interface module 1012 begins interacting with a retrieval manager 1014 of the computing device 1004. The retrieval manager 1014 includes a master storage and backup map 1016. In this embodiment, when the software application 1010 is directed to retrieve data, the data is sent to the installed file system/interface module 1012 and then to the software applications 1010. To find the location of the data that is to be retrieved, the retrieval manager 1014 views the information in the master storage and backup map 1016. The information from the retrieval manager 1014 is passed to the installed file system/interface module 1012 so that the computing device that knows the exact location of the data is then known and can be retrieved from the storage media.

For example, computing device 1006 may be where the system looks to retrieve the data of interest. The computing device 1006 includes a media module 1022 having a data index 1024 that would indicate the specific location of the data to be retrieved. This data will be stored in a storage media such as the magnetic disk media 1008 or optical media 1026. Of course, other types of storage media are available and more than two storage media could be available from the computing device 1006. When the data is found, it is then passed back to the software applications 1010 through the network 1007.

The retrieval manager 1014 of the computing device 1004 may indicate that the data is stored at computing device 1028 based on the information found on the master storage and backup map 1016. In this case, the retrieval system 1000 must look to a media module 1030 of the computing device 1028 where a data index 1032 indicates the exact location of the data to be retrieved. In this example, the data may be located in a magnetic tape media 1034 or other media. in addition, the retrieval manager 1014 may indicate that the data can be found by looking to computing device 1036 where a media module 1038 uses data index 1040 to find the exact location of the data on other storage 1042.

It is understood that data may migrate from one storage media to another and the original location where the data is stored may vary over time. However, the movement of data is tracked by the respective data indexes 1024, 1032, and 1040, so that wherever the data happens to be currently located, the software application 1010 may retrieve the data without undo delay or undesired assistance.

Multiple variations exist for the retrieval system 1000 as shown by components illustrated in dashed lines.

Specifically, a manager module 1046 may exist in the computing device 1002 where it interacts with a media module 1048 to obtain data directly from storage media 1050 without having to interact with other computing devices. In other embodiments, a media module 1052 may be located in the computing device 1004 where data is found in storage media 1054. In another embodiment, a manager module 1044 may be present in the computing device 1036. Those skilled in the art and viewing the present disclosure will understand that numerous possibilities exist using the same concepts.

Figure 11:
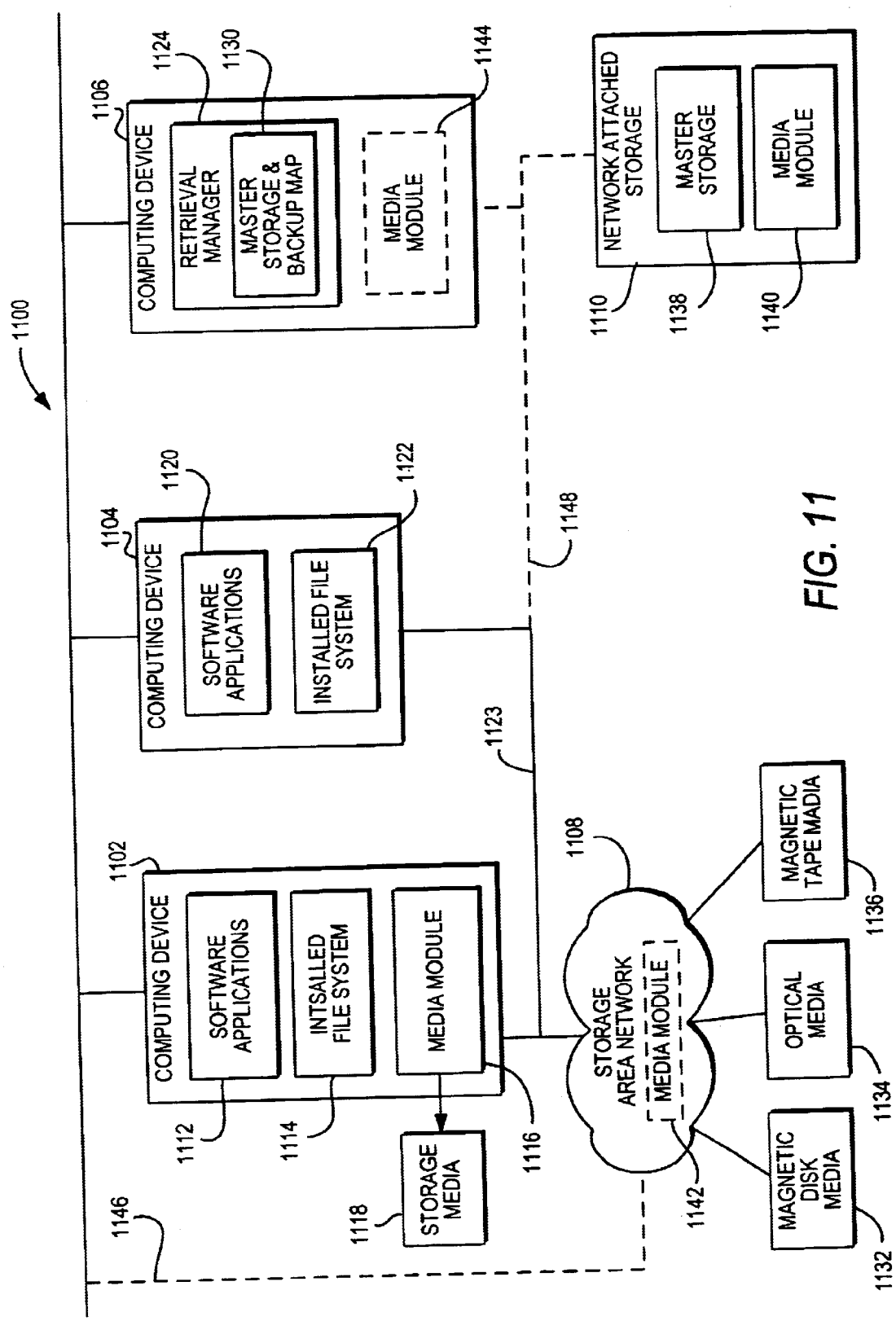
FIG. 11 is a block diagram of another exemplary retrieval system.

FIG. 11 is a block diagram of another exemplary retrieval system 1100. The retrieval system 1100 includes a computing device 1102, a computing device 1104, and a computing device 1106. The computing devices 1102, 1104, and 1106 interact to retrieve data through either a storage area network 1108 or a network attached storage 1110.

For example, computing device 1102 includes a software application 1112 that interacts with an installed file system 1114. The installed file system 1114 interacts with a media module 1116 that could indicate that the data to be retrieved is located in storage media 1118. Alternatively, computing device 1104 includes software applications 1120 that interacts with the installed file system 1122 to retrieve data. For the computing device 1104 to retrieve data, the installed file system 1122 may have to interact with the computing device 1106 because the computing device 1106 includes a retrieval manager 1124 that includes a master storage and backup map 1130. When the information for retrieval is located, the information is passed back to the computing device 1104 and to the installed file system 1122.

This information may be used by the installed file system 1122 to locate information that is stored on the storage area network 1108. Of note, the storage area network 1108 is connected to the computing devices 1102 and 1104 through a high-speed fibre network 1123. For example, the data may be located on a magnetic disk media 1132, optical media 1134, or a magnetic tape media 1136. The installed file system 1122 will have the information that the storage area network 1108 needs to access the specific information. On the other hand, the installed file system 1122 may understand from the computing device 1106 that the information to be retrieved is located in the network attached storage 1110. If this is the case, the network attached storage 1110 has a media module 1138 where the exact location of the data is found in a storage media 1140.

As illustrated by dashed lines, numerous variations may be made to the illustrated retrieval system 1100. For example, the storage area network 1108 may include a media module 1142 so that the computing device 1104 does not need to communicate with both a computing device 1106 and a computing device 1102 to access data across the fibre network 1123 from the storage area network 1108. In addition, a media module 1144 may be located in the computing device 1106 to alter the data accessing techniques of the retrieval system 1100.

Dashed lines also indicate that the storage area network may be connected directly to the network 1146 of the computing devices and dashed lines 1148 indicate that the network attached storage may be connected through the fibre network 1123 to the computing devices 1102, 1104 or across a regular network to the computing devices.

What is claimed is:

1. A data retrieval system comprising:
a computer system having a processor that supports operation of at least one software application that is used for retrieving data in the computer system;

a plurality of storage media communicatively coupled to the processor, the plurality of storage media having data stored in at least one of the plurality of storage media;

a plurality of computing devices communicatively coupled to processor and the plurality of storage media;

the software application having a retrieval module for retrieving data from the plurality of storage media;

a storage and backup map that maps to the plurality of computing devices; and a data index stored on at least one of said plurality of computing devices that indicates to the retrieval module a particular location of the data that is to be retrieved by the retrieval module.

2. The data retrieval system of claim 1 wherein the software application includes a tool bar that allows access to particular characteristics of a file that has been stored in at least one of the plurality of storage media.

3. The data retrieval system of claim 2 wherein the particular characteristics comprise file creation date, file backup dates, and file access dates.

4. The data retrieval system of claim 1 wherein the software application comprises a view menu that offers a user an option to select a date in which to begin displaying a history of a selected file(s).

5. The system of claim 1, wherein the data index is updated when data is moved between the plurality of storage media.

6. A method for retrieving data in a computer system, the computer system having a plurality of storage media where data is stored, the storage media being communicatively coupled to a plurality of computing devices, the method comprising:

requesting access to selected data of the computer system;

activating a retrieval control to find a particular location of the selected data that has been requested;

selecting with the retrieval control, one of the plurality of computing devices storing the selected data based upon instructions contained in a storage map;

determining, according to a data index stored on the selected computing device, the particular location of the selected data on the plurality of storage media;

retrieving an indication of the selected data from the particular location in the plurality of storage media; and displaying the indication such that a user has an option of gaining additional information regarding the selected data.

7. The method of claim 6 further comprising selecting the indication to display a backup history of a portion of the selected data.

8. The method of claim 6 further comprising selecting the indication to display a history of access times for a portion of the selected data.

9. The method of claim 6 further comprising selecting the indication to display an origination date of a portion of the selected data.

10. The method of claim 6, wherein determining the particular location of the selected data according to a data index comprises updating the data index when data is moved between the plurality of storage media.

* * * * *